United States Patent
Hota et al.

(10) Patent No.: US 11,057,641 B1
(45) Date of Patent: Jul. 6, 2021

(54) SYSTEMS AND METHODS OF MOTION ESTIMATION USING MONOCULAR EVENT-BASED SENSOR

(71) Applicant: SAMSUNG ELECTRONICS CO., LTD., Suwon-si (KR)

(72) Inventors: Manjit Hota, Bangalore (IN); Karthik Srinivasan, Bangalore (IN); Puneet Pandey, Bangalore (IN); Ayush Goel, Lucknow (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/019,609

(22) Filed: Sep. 14, 2020

(30) Foreign Application Priority Data

Apr. 29, 2020 (IN) .............................. 202041018373

(51) Int. Cl.
  *H04N 19/56* (2014.01)
  *H04N 19/172* (2014.01)
  *H04N 19/137* (2014.01)
  *H04N 19/57* (2014.01)

(52) U.S. Cl.
  CPC .......... *H04N 19/56* (2014.11); *H04N 19/137* (2014.11); *H04N 19/172* (2014.11); *H04N 19/57* (2014.11)

(58) Field of Classification Search
  CPC ...... H04N 19/176; H04N 19/51; H04N 19/56; H04N 19/543; H04N 19/513; H04N 19/521; H04N 19/527; H04N 19/137; H04N 19/139; H04N 19/172; H04N 19/174; H04N 19/57
  USPC ....................................... 375/240.01–240.29
  See application file for complete search history.

(56) References Cited

U.S. PATENT DOCUMENTS

| 5,477,278 | A  | * | 12/1995 | Kitaura | ................. | H04N 5/145 348/699 |
| 2003/0123551 | A1 | * | 7/2003 | Kim | ..................... | H04N 9/8042 375/240.16 |
| 2004/0252765 | A1 | * | 12/2004 | Hosoda | ................ | H04N 5/4448 375/240.16 |

OTHER PUBLICATIONS

Scaramuzza, Davide, "Tutorial on Event-based Vision for High-Speed Robotics", Robotics & Perception Group, 2015, http://rpg.ifi.uzh.ch, University of Zurich.

* cited by examiner

*Primary Examiner* — Nathnael Aynalem
(74) *Attorney, Agent, or Firm* — Sughrue Mion, PLLC

(57) ABSTRACT

Provided is a method of motion estimation for processing a video stream comprising a plurality of frames, the method including segmenting at least one frame, from among the plurality of frames, into a plurality of blocks, determining an event density factor for each block included in a frame, wherein the event density factor of the block corresponds to a number of events accumulated in the block across frames in a predetermined time duration, comparing the determined event density factor with a threshold value, estimating a motion vector of the block based on the comparison, and processing the block in the video stream based on the estimated motion vector of the block.

20 Claims, 7 Drawing Sheets

SYSTEMS AND METHODS OF MOTION ESTIMATION USING MONOCULAR EVENT-BASED SENSOR

CROSS-REFERENCE TO THE RELATED APPLICATION

This application claims priority to Indian Patent Application No. 202041018373 filed on Apr. 29, 2020 in the Indian Intellectual Property Office, the entire disclosure of which is incorporated herein by reference.

BACKGROUND

1. Field

Example embodiments of the present disclosure relate to processing of video streams and more particularly, relates to systems and methods of motion estimation for processing a video stream having a plurality of frames.

2. Description of Related Art

A traditional camera may output frames at fixed time intervals. Further, the successive frames contain an enormous amount of redundant information, for example, information relating to portions where no change has occurred. This leads to wastage of resources, such as of memory access, random access memory (RAM), disk space, energy, computational power, and time. Further, considering that each frame imposes the same exposure time on every pixel, it becomes difficult to clearly capture scenes containing very dark and very bright regions. In order to address these deficiencies, event-based sensors are used for detecting a portion witnessing a change in the frame. Only these portions are then processed further, instead of the entire frame.

Particularly, an event-based sensor outputs asynchronous events at microsecond resolution and generates an event, only upon detecting a change in the value of at least one pixel. Therefore, instead of wastefully sending entire images at fixed frame rates, local pixel-level changes caused by movement in a scene are transmitted and only at the time of their occurrence. The result is a stream of events at microsecond time resolution, equivalent to or greater than conventional high-speed vision sensors running at thousands of frames per second. Therefore, by estimating the motion in only the concerned portions of the frame, the entire process is made relatively simpler.

To estimate a motion in a scene, for example, a scene being monitored by the event-based sensors, each block from a frame is compared with a block from a reference frame, for example, from a preceding frame. The complexity associated with the motion estimation varies depending on factors, such as resolution and frame rate. For example, the complexity increases with an increase in the resolution and the frame rate of the video stream. Similarly, other factors, such as a fixed search mechanism, a search range, precession of motion vectors, and a block partition size, also contribute to the complexity associated with the motion estimation. For example, it is not practically possible to match each block of a frame with all the blocks of the reference frame to estimate the motion, as that would require substantially high processing resources. Therefore, only some blocks of the reference frame, for example, the blocks that are in the vicinity of the original block are matched. Thus, the existing techniques are fragmented in nature and are complicated as well. Moreover, cost associated with the processing of the video stream by the existing techniques is high.

Therefore, there is a need of a comprehensive and cost-effective approach of motion estimation for processing of video streams, such as for encoding applications, streaming applications, and compression applications.

SUMMARY

One or more example embodiments provide processing of video streams and more particularly, systems and methods of motion estimation for processing a video stream having a plurality of frames.

According to an aspect of an example embodiment, there is provided a method of motion estimation for processing a video stream comprising a plurality of frames, the method including segmenting at least one frame, from among the plurality of frames, into a plurality of blocks, determining an event density factor for each block included in a frame, wherein the event density factor of the block corresponds to a number of events accumulated in the block across frames in a predetermined time duration, comparing the determined event density factor with a threshold value, estimating a motion vector of the block based on the comparison, and processing the block in the video stream based on the estimated motion vector of the block.

According to another aspect of an example embodiment, there is provided a method of motion estimation for processing a video stream including a plurality of frames, the method including segmenting at least one frame, from among the plurality of frames, into a plurality of blocks, determining an event density factor for each block included in a frame, wherein the event density factor of the block corresponds to a number of events accumulated in the block across frames in a predetermined time duration, comparing the determined event density factor with a threshold value, estimating motion vector of the block to process the video stream based on the comparison, generating an event density map based on the comparison of the event density factor with the threshold value for each block, generating a block-level segmentation map based on spatial correlation analysis of the event density map, wherein similar density areas are grouped together to generate the block-level segmentation map, and determining a size of each of the plurality of blocks to segment the frame for motion estimation based on the block-level segmentation map, wherein the size is a minimum supported size for the motion estimation.

According to another aspect of an example embodiment, there is provided a system of motion estimation for processing a video stream including a plurality of frames, the system including at least one processor configured to implement a segmenting module configured to segment at least one frame, from among the plurality of frames, into a plurality of blocks, a determining module configured to communicate with the segmenting module and determine an event density factor for each block included in a frame, wherein the event density factor of a block corresponds to a number of events accumulated in the block across frames in a predetermined time duration, a comparing module configured to communicate with the determining module and compare the determined event density factor with a threshold value, an estimating module configured to communicate with the comparing module and estimate a motion vector of the block, based on the comparison, and a processing module configured to communicate with the estimating module and process the block in the video stream based on the estimated motion vector of the block.

BRIEF DESCRIPTION OF DRAWINGS

The above and/or other features, aspects, and advantages of example will become better understood when the following detailed description is read with reference to the accompanying drawings, wherein.

DETAILED DESCRIPTION

Figure 1:
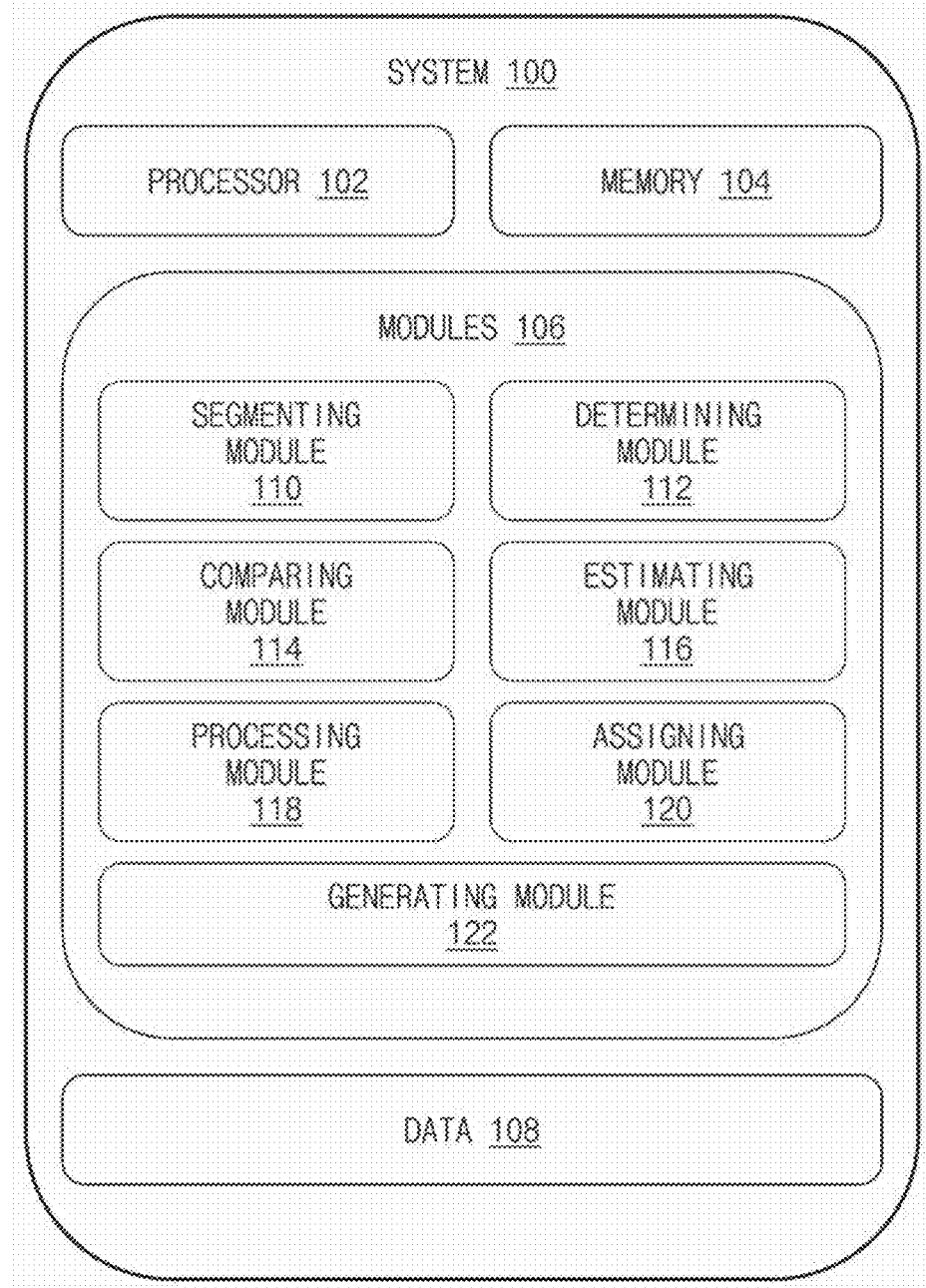
FIG. 1 illustrates a block diagram of a system of motion estimation for processing a video stream having a plurality of frames according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Further, elements in the drawings are illustrated for simplicity and may not have been necessarily been drawn to scale. For example, the flow charts illustrate the method in steps to help to improve understanding of aspects of the present disclosure. Furthermore, in terms of the construction of the device, one or more components of the device may have been represented in the drawings by conventional symbols, and the drawings may show only those specific details that are pertinent to understanding the example embodiments to not obscure the drawings with details that will be readily apparent to those of ordinary skill in the art having benefit of the description herein.

Example embodiments will be described below in detail with reference to the accompanying drawings.

FIG. 1 illustrates a block diagram of a system 100 of motion estimation for processing a video stream having a plurality of frames according to an example embodiment. The system 100 may communicate with a monocular event-based sensor to receive an input data of a scene being captured. The input data may include, but is not limited to, a stream of pixel intensity data of the scene and an event data of the scene. The event data of the scene may further include, but is not limited to, address event representation (AER) data and event velocity data.

In an example embodiment, the monocular event-based sensor may include, but is not limited to, an active pixel sensor (APS) and an event-based sensor (EBS). The APS may be configured to obtain the stream of the pixel intensity data of the scene, whereas the EBS may be configured to obtain the event data of the scene. Therefore, the system 100 may receive the input data for motion estimation to process the video stream.

In an example embodiment, the system 100 may include, but is not limited to, a processor 102, a memory 104, modules 106, and data 108. The modules 106 and the memory 104 may be coupled to the processor 102. The processor 102 may be a single processing unit or a number of units, all of which could include multiple computing units. The processor 102 may be implemented as one or more microprocessors, microcomputers, microcontrollers, digital signal processors, central processing units, state machines, logic circuitries, and/or any devices that manipulate signals based on operational instructions. The processor 102 may be configured to fetch and execute computer-readable instructions and data stored in the memory 104.

The memory 104 may include any non-transitory computer-readable medium including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The modules 106 may include routines, programs, objects, components, data structures, etc., which perform particular tasks or implement data types. The modules 106 may also be implemented as, signal processor(s), state machine(s), logic circuitries, and/or any other device or component that manipulate signals based on operational instructions.

Further, the modules 106 can be implemented in hardware, instructions executed by a processing unit, or by a combination thereof. The processing unit may comprise a computer, a processor, such as the processor 102, a state machine, a logic array or any other suitable devices capable of processing instructions. The processing unit may be a general-purpose processor which executes instructions to cause the general-purpose processor to perform the required tasks or, the processing unit can be dedicated to perform the required functions. In another example embodiment, the modules 106 may be machine-readable instructions (software) which, when executed by a processor/processing unit, may perform any of the described functionalities.

In an implementation, the modules 106 may include a segmenting module 110, a determining module 112, a comparing module 114, an estimating module 116, a processing module 118, an assigning module 120, and a generating module 122. The segmenting module 110, the determining module 112, the comparing module 114, the estimating module 116, the processing module 118, the assigning module 120, and the generating module 122 may communicate with each other. Further, the data 108 may be configured to store data processed, received, and generated by one or more of the modules 106.

Upon receiving the input data from the monocular event-based sensor, the segmenting module 110 may segment at least one frame, from among the plurality of frames, into a plurality of blocks. In an example embodiment, the segmenting module 110 may communicate with the determining module 112. The determining module 112 may determine an event density factor for each block of a frame. The event density factor of a block may be indicative of a number of events accumulated in the block across frames in a predefined time duration. In an example embodiment, the event density factor may be determined based on Equation 1, where Dxy is an event density at block location (x, y), Exy is an event present/Not=>[+/−1=>Event present, 0=>No event], h is a height of the block for density computation, and w is a width of the block for density computation.

$$D_{xy} = \sum_{y=0}^{h} \sum_{x=0}^{w} E_{xy}$$ [Equation 1]

The determining module 112 may communicate with the comparing module 114.

The comparing module 114 may compare the determined event density factor with a predefined threshold value of the event density factor. The predefined threshold value may be selected based on the sensitivity of the motion that is to be captured in a scene. The comparing module 114 may communicate with the estimating module 116.

The estimating module 116 may estimate a motion vector in the block, based on the comparison. The motion vector of a block is indicative of a movement of the block across frames. The motion vector may be understood as a bi-directional pointer indicating a change in a movement of the block between two frames. The movement may be indicated in terms of horizontal and vertical coordinates. The estimating module 116 may communicate with the processing module 118. The processing module 118 may process the blocks in the video stream based on the estimated motion vector.

In an example embodiment, the comparing module 114 may communicate with the processing module 118. In an example embodiment where the event density factory is higher than the predefined threshold value, the estimating module 116 may estimate the motion vector in the block.

The comparing module 114 may also communicate with the assigning module 120. In an example embodiment where the event density factor is lower than the predefined threshold value, the assigning module 120 may assign a zero motion vector to the block to mark the block to be not processed. Therefore, the zero motion vector would indicate that the block is not be processed further. The system 100 processes the block only in cases where the event density factor is higher than the predefined threshold value. The system 100 does not process the block having the event density factor lower than the predefined threshold value. This would significantly reduce the complexity, the time, and the cost associated with the processing of the video stream.

In another example embodiment, the comparing module 114 may communicate with the generating module 122. The generating module 122 may generate an event density map. The event density map may be generated based on the comparison of the event density factor with the predefined threshold value for each block. Therefore, the event density map may show the event density factors of all the blocks of a frame. In an example embodiment, to generate the event density map, the system 100 may determine a plurality of threshold values for the event density factor. Further, a block may be indicated in the event density map, based on the comparison of an event density factor of the block with the plurality of threshold values. For example, the system 100 may set three threshold values of the event density factor TH1, TH2, and TH3, to generate the event density map. For example, each block may fall in one of the four groups, Group 1 where Dxy<TH1, Group 2 where TH1<Dxy<TH2, Group 3 where TH2<Dxy<TH3, and Group 4 where TH3<Dxy.

Further, the system 100 may perform a spatial correlation analysis of the event density map. Based on the spatial correlation analysis of the event density map, the generating module 122 may generate a block-level segmentation map. In the block-level segmentation map, similarly density areas may be grouped together. The generating module 122 may communicate with the determining module 112.

Based on the block-level segmentation map, the determining module 112 may be adapted to determine a size of blocks to segment the frame for motion estimation. The size determined by the determining module 112 may be the minimum supported size for the motion estimation.

In an example embodiment, the determining module 112 may further communicate with the processing module 118. The processing module 118 may perform motion estimation for a block, when the plurality of blocks is of a first size. Similarly, the processing module 118 may perform motion estimation for the block, when the plurality of blocks is of a second size that is different from the first size. The processing module 118 may also communicate with the segmenting module 110. The segmenting module 110 may segment the frame into a plurality of blocks of one of the first size and the second size, based on complexity associated with the motion estimation for the block of the first size and the second size.

For example, the system 100 may determine the complexity associated with the motion estimation with the first size of blocks. Further, the system 100 may determine whether the first size of blocks is the minimum possible size for the motion estimation or processing of the video stream. When the system 100 determines that the first size is the minimum possible size, the system 100 may proceed to the next block of the frame for processing. When the system 100 determines that the first size is not the minimum possible size, the segmenting module 110 may further segment the frame into the block of the second size.

In an example, the frame may be segmented into blocks of 128×128. When the system 100 determines that this is not the minimum possible size, the frame may then be segmented into blocks of 64×64. When the system 100 still determines that this is not the minimum possible size, the frame may be segmented into blocks of 32×32. Therefore, until the minimum possible size for motion estimation is obtained, the system 100 may keep segmenting the frame. Therefore, depending on the complexity and the minimum possible size, the frame is segmented by the system 100 for processing the video stream.

In another example embodiment, based on the block-level segmentation map, the estimating module 116 may estimate a first size of blocks for the segmentation of the frame for motion estimation. Further, the determining module 112 may determine the event density factor for each block of the frame. The block may be of the first size. Based on the event density map, the comparing module 114 may compare the event density factor with a predefined threshold value for the event density factor. Based on the comparison, the estimating module 116 may estimate motion vector in the block to process the video stream. According to the example embodiment, a low complexity solution where the system 100 processes the frame having the block size as derived from the block segmentation map generated based on the data from the EBS may be provided.

Figure 2:
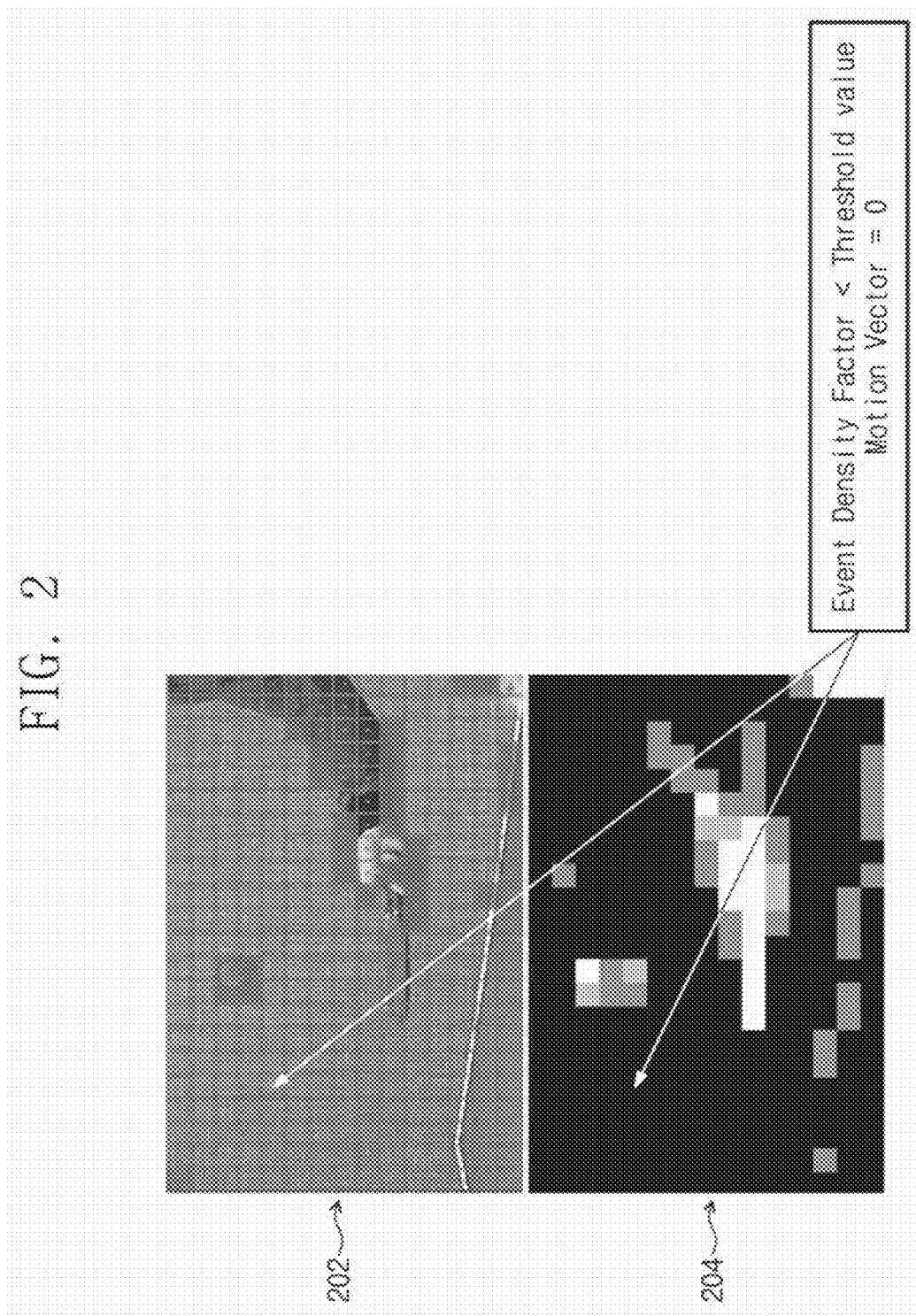
FIG. 2 illustrates an example bit stream being processed by the system according to an example embodiment.

FIG. 2 illustrates an example bit stream 202 and an example heat map 204 being processed by the system 100 according to an example embodiment. As illustrated, there are blocks of the frame where the event density factor is zero, which are portions where no events are detected by the EBS. Accordingly, the system 100 assigns a zero motion vector to these portions and these portions are not processed. Further, in the blocks where the motion vector is not zero and some movement is detected, the block may further be segmented into sub-blocks for detailed analysis.

Figure 3:
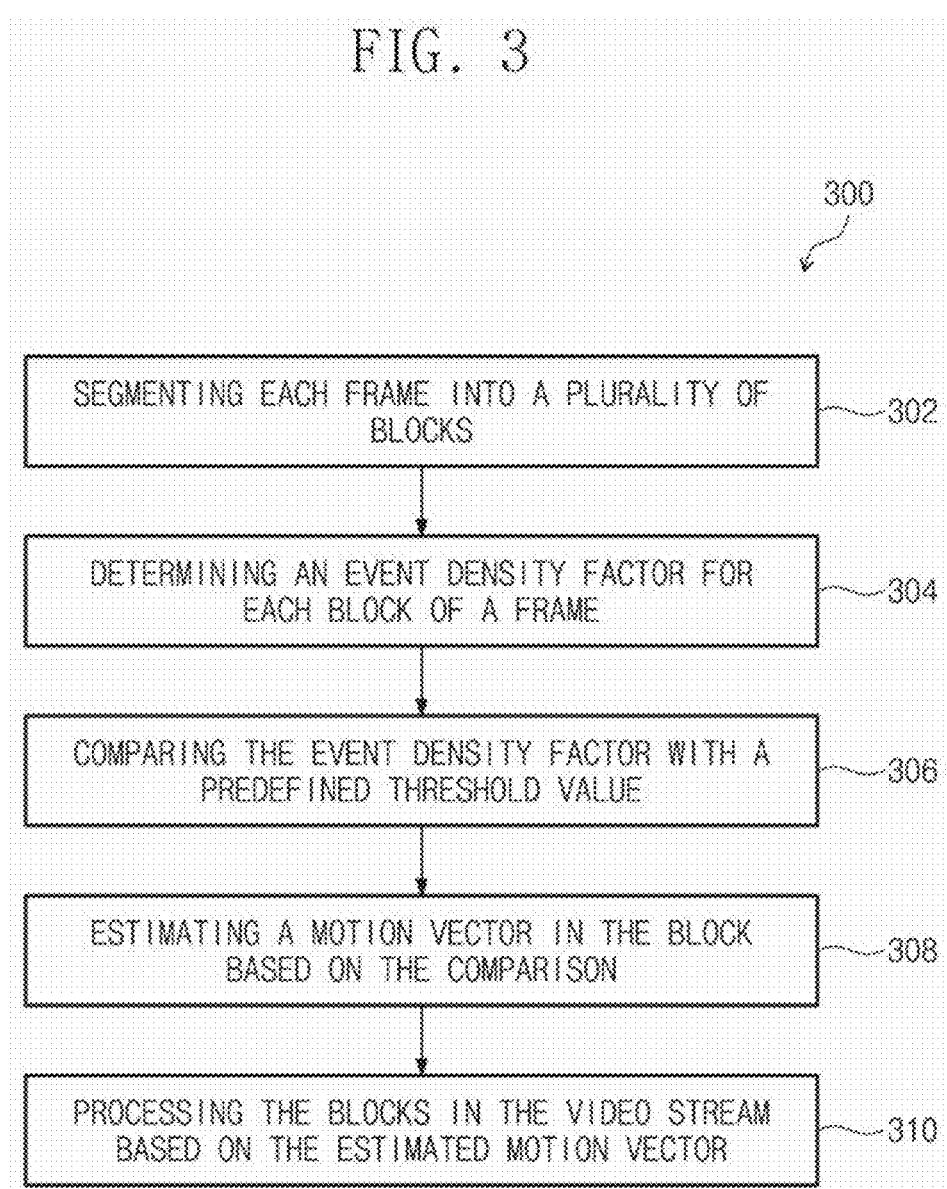
FIG. 3 illustrates a flowchart depicting a method of motion estimation for processing the video stream having the plurality of frames according to an example embodiment.

FIG. 3 illustrates a flowchart depicting a method 300 of motion estimation for processing the video stream having the plurality of frames according to an example embodiment. In an example embodiment, the method 300 may be a computer-implemented method 300. In an example embodiment, the method 300 may be executed by the processor 102. Further, features that are explained in detail with regard to FIGS. 1 and 2 will be omitted.

At step 302, each frame is segmented into the plurality of blocks. In an example embodiment, the segmenting module 110 of the system 100 may segment the frame into the blocks.

At step 304, the event density factor for each block of the frame is determined. The event density factor of a block shows a number of events accumulated in the block across frames in a predefined time duration. In an example embodiment, the determining module 112 may determine the event density factor.

At step 306, the determined event density factor is compared with a predefined threshold value of the event density factor. In an example embodiment, the comparing module 114 may perform the comparison.

At step 308, a motion vector in the block is estimated based on the comparison. In an example embodiment, the estimating module 116 may estimate the motion vector.

At step 310, the blocks in the video stream is processed based on the estimated motion vector. In an example embodiment, the processing module 118 may process the blocks in the video stream.

In an example embodiment, the method 300 includes estimating the motion vector in the block, when the event density factor is higher than the predefined threshold value. In another example embodiment, the method 300 includes assigning a zero motion vector to the block for marking the block not to be processed, when the event density factor is lower than the predefined threshold value.

Figure 4:
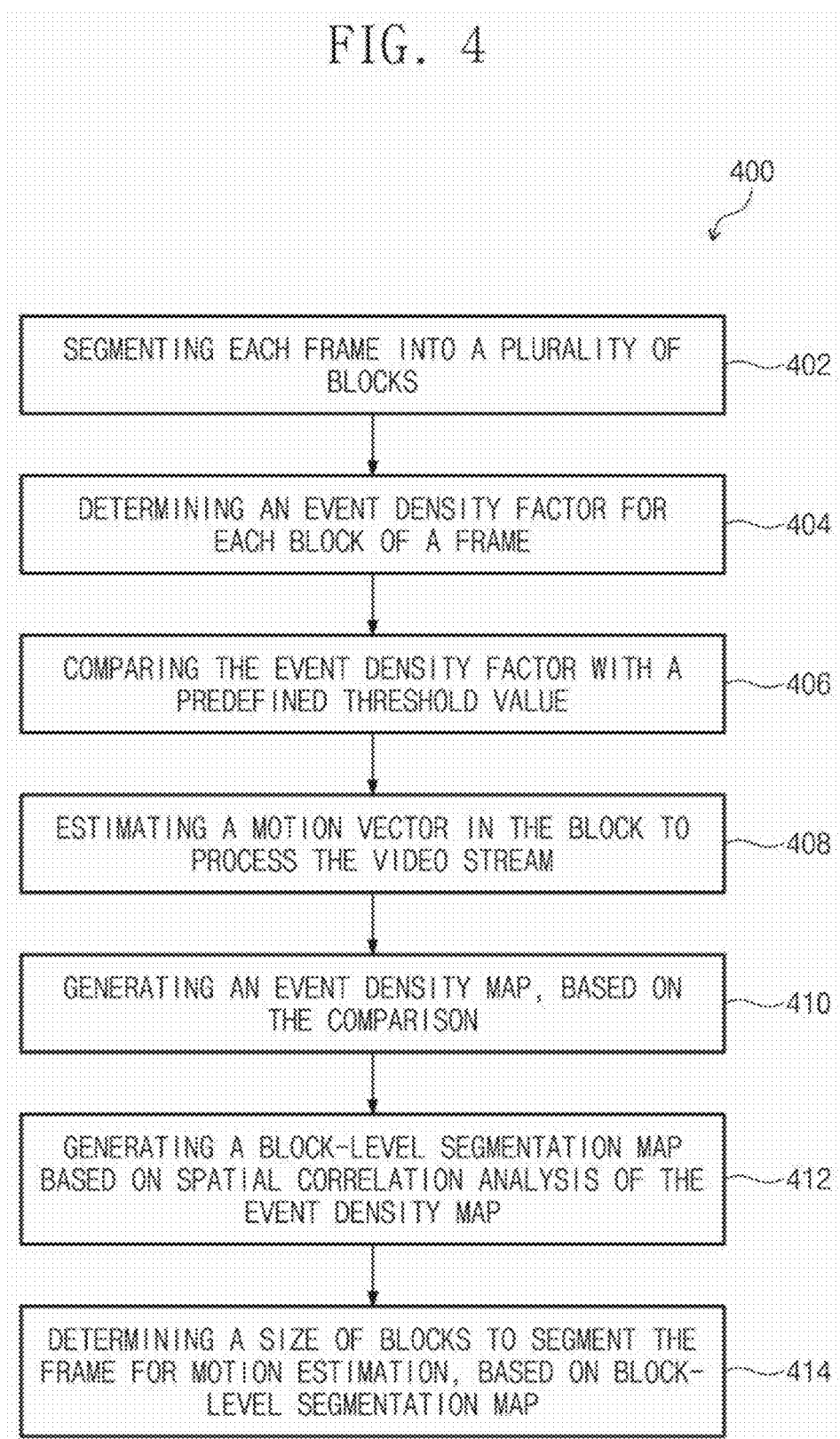
FIG. 4 illustrates a flowchart depicting a method of motion estimation for processing the video stream having the plurality of frames according to another example embodiment.

FIG. 4 illustrates a flowchart depicting a method 400 of motion estimation for processing the video stream having the plurality of frames, according to an example embodiment. In an example embodiment, the method 400 may be a computer-implemented method 400. In an example embodiment, the method 400 may be executed by the processor 102. Further, features that are explained in details with respect to FIGS. 1, 2, and 3 will be omitted.

At step 402, each frame is segmented into the plurality of blocks. In an example embodiment, the segmenting module 110 of the system 100 may segment the frame into the blocks.

At step 404, the event density factor for each block of the frame is determined. The event density factor of a block is indicative of a number of events accumulated in the block across frames in a predefined time duration. In an example embodiment, the determining module 112 may determine the event density factor.

At step 406, the determined event density factor is compared with a predefined threshold value of the event density factor. In an example embodiment, the comparing module 114 may perform the comparison.

At step 408, a motion vector in the block to process the video stream is estimated based on the comparison. In an example embodiment, the estimating module 116 may estimate the motion vector.

At step 410, the event density map is generated based on the comparison of the event density factor with the predefined threshold value for each block. In an example embodiment, the generating module 122 may generate the event density map.

At step 412, the block-level segmentation map is generated based on the spatial correlation analysis of the event density map. In the block-level segmentation map, similar density areas are grouped together. In an example embodiment, the generating module 122 may generate the block-level segmentation map.

At step 414, a size of blocks to segment the frame for motion estimation is determined based on the block-level segmentation map. The size is the minimum supported size for the motion estimation. In an example embodiment, the determining module 112 may determine the size of blocks.

In an example embodiment, the method 400 includes performing motion estimation for a block, when the plurality of blocks is of the first size and of a second size that is different from the first size. The method 400 includes segmenting the frame into the plurality of blocks of one of the first size and the second size, based on complexity associated with the motion estimation for the block of the first size and the second size.

Figure 5:
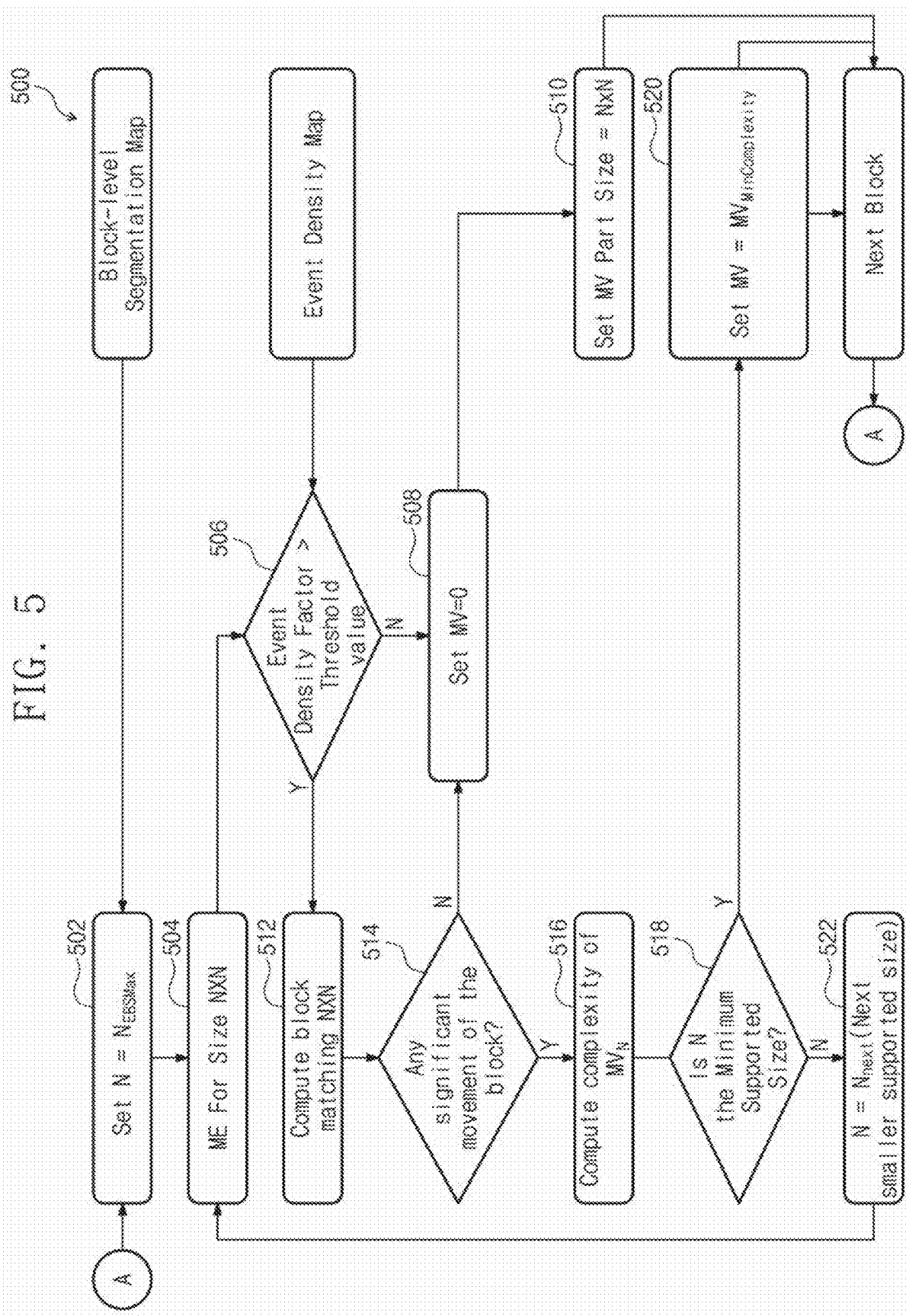
FIG. 5 illustrates a flowchart depicting a method of motion estimation for processing the video stream having the plurality of frames according to yet another example embodiment.

FIG. 5 illustrates a flowchart depicting a method 500 of motion estimation for processing the video stream having the plurality of frames according to the example embodiment. In the example embodiment, the method 500 may be a computer-implemented method 500. In the example embodiment, the method 500 may be executed by the processor 102. Further, features that are explained in details with respect to FIGS. 1, 2, 3, and 4 are omitted.

At step 502, the block size N may be selected as $N_{EBSMax}$. The size may be selected based on the block-level segmentation map generated by using the data from the EBS. At step 504, motion estimation for the block size of N×N may be performed. At step 506, whether an event density factor of the block is greater than the predefined threshold value is determined.

In an example embodiment, when it is determined that the event density factor is lower than the predefined threshold value, the method 500 proceeds to step 508. At step 508, zero motion vector is assigned to the block. At step 510, the block size is set as N×N for further analysis of the blocks. Thereafter, the method 500 is repeated for the next block to be analyzed.

Figure 6:
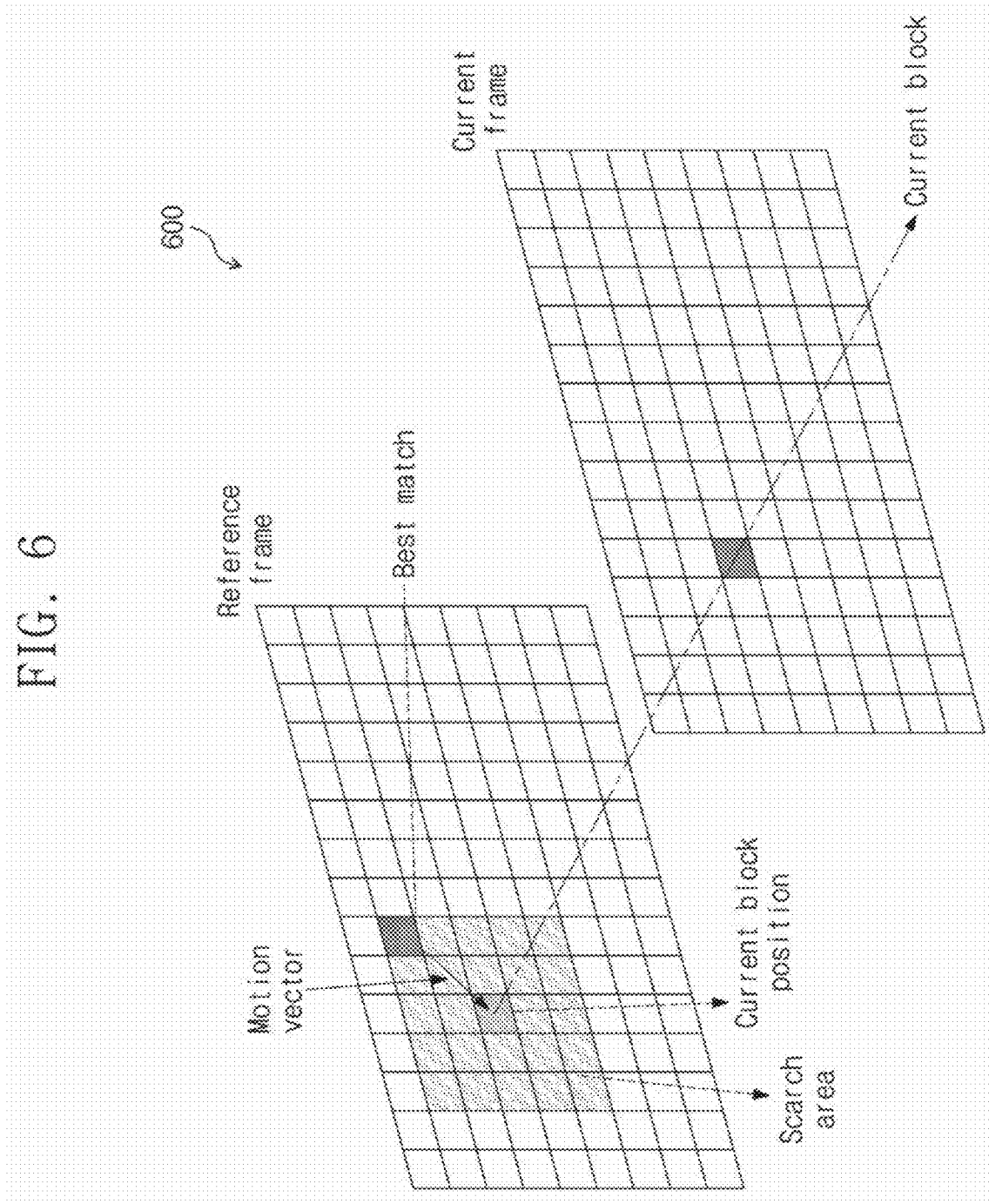
FIG. 6 illustrates an example depicting block matching across a pair of frames according to an example embodiment.

When it is determined that the event density factor is greater than the predefined threshold value at step 506, the method 500 proceeds to step 512. At step 512, block matching is computed between the frames. FIG. 6 illustrates an example 600 depicting the block matching across a pair of frames according to an example embodiment. As shown in FIG. 6, a block from the current frame is compared or matched with a corresponding block in a reference frame. There is a search area designated in the reference frame that is being searched for mapping the block from the current frame. The movement of the block is indicated by the motion vector.

Referring back to FIG. 5, at step 514, based on the mapping, whether there has been any significant movement of the block with respect to the reference frame is determined. When it is determined that there has not been any significant movement of the block, the method 500 proceeds to step 508 where the motion vector of the block is set as zero and the method 500 proceeds as explained above.

When it is determined that there has been a significant movement of the block at step 514, the method 500 proceeds to step 516. At step 516, complexity associated with the motion estimation of the blocks of size N×N is computed. At step 518, whether N is the minimum supported size for the processing of the video stream is determined. When it is determined that N is the minimum supported size at step 518, the method 500 proceeds to step 520. At step 520, the block size for the minimum complexity and therefore for the minimum cost of processing the video stream is set. Thereafter, the method 500 includes selecting the next block for analysis.

When it is determined that N is not the minimum supported size at step 518, the method 500 proceeds to step 522. At step 522, the next possible smallest size for the blocks is selected. From step 522, the method 500 proceeds to step 504 where the motion estimation is performed for the selected smallest block size. Therefore, the method 500 may be repeated until the minimum possible size for the blocks is obtained.

Referring back to FIG. 4, in an example embodiment, the method 400 includes estimating the first size of blocks for the segmentation of the frame for motion estimation based on the block-level segmentation map. The method 400 then includes determining the event density factor for each block of the frame, and comparing the determined event density factor with the predefined threshold value of the event density factor based on the event density map. Based on the comparison, the method 400 includes estimating motion vector in the block to process the video stream.

Figure 7:
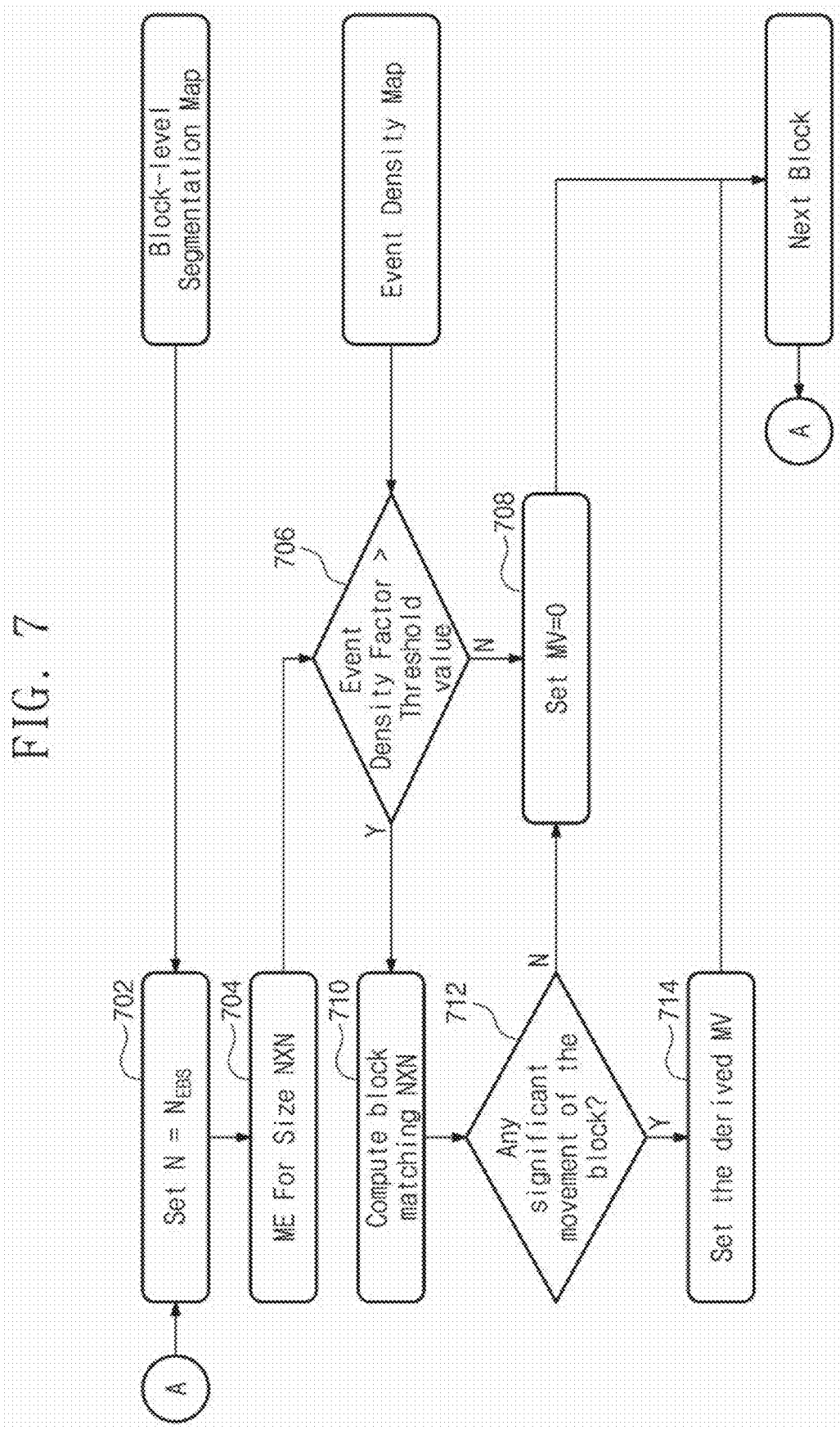
FIG. 7 illustrates a flowchart depicting a method of motion estimation for processing the video stream having the plurality of frames according to an example embodiment.

FIG. 7 illustrates a flowchart depicting a method 700 of motion estimation for processing the video stream having the plurality of frames according to an example embodiment. According to the example embodiment, a solution with even less complexity may be provided. In the example embodiment, the method 700 may be a computer-implemented method 700. In the example embodiment, the method 700 may be executed by the processor 102. Further, features that are explained in details with respect to FIGS. 1, 2, 3, 4, 5, and 6 will be omitted.

At step 702, the block size N is selected as $N_{EBS}$. The size may be selected based on the block-level segmentation map generated by using the data from the EBS. At step 704, motion estimation for the block size of N×N is performed. At step 706, whether an event density factor of the block is greater than the predefined threshold value is determined.

In an example embodiment, when it is determined that the event density factor is lower than the predefined threshold value at step 706, the method 700 proceeds to step 708. At step 708, zero motion vector is assigned to the block. Thereafter, the method 700 is repeated for the next block to be analyzed.

When it is determined that the event density factor is greater than the predefined threshold value at step 706, the method 700 proceeds to step 710. At step 710, block matching is computed between the frames. At step 712, based on the mapping, whether there has been any significant movement of the block with respect to the reference frame is determined. When it is determined that there has not been any significant movement of the block at step 712, the method 700 proceeds to step 708 where the motion vector of the block is set as zero and the method 700 proceeds thereon as explained above.

When it is determined that there has been a significant movement of the block at step 712, the method 700 proceeds to step 714. At step 714, the derived motion vector for the block is set based on the movement of the block. The method 700 further proceeds in the same manner for the subsequent block.

According to example embodiments, a comprehensive approach of motion estimation for processing a video stream may be provided. For example, the accuracy of the motion estimation may be significantly improved, for example, due to the consideration of the event density factor by the system 100. Further, the data received from the EBS may be used for various processing of the video stream, such as for the streaming applications, compression applications, and encoding applications.

Further, the block-level segmentation map may assist the system 100 to determine an estimated block size to initiate the processing of the blocks. For example, when the related example may initiate the processing of the blocks with a size of 128×128, the system 100 according to example embodiments may initiate a processing of the blocks with a size of 32×32. Therefore, the block-level segmentation map allows the system 100 to avoid the processing of at least two bigger sizes of the blocks according to example embodiments.

Furthermore, the system 100 may obtain the minimum size of the blocks while maintaining the quality of processing of the video stream. The system 100 may iteratively suggest the block size until the accurate size is obtained. The system 100 may intelligently use EBS data events to consider spatial correlation factors which can help in deciding the prediction unit block on sizes for a frame. Particularly, in case of video compression, the residual will be computed very efficiently if the blocks are partitioned properly. Further, in case of multi-frame noise reduction, the block precision will provide better matching in terms of spatial region, thereby improving the noise reduction performance. In case of smoother area and background with high spatial correlation, bigger block sizes and therefore less entropy may be achieved.

Moreover, the system 100 according to example embodiments may provide a simpler approach of motion estimation. For example, the system 100 may initiate motion estimation with a block size first suggested by the block-level segmentation map. Therefore, the example embodiment may reduce the time for the motion estimation and the subsequent processing of the video stream.

Moreover, the system 100 according to example embodiments may adapt to changes and motion, and therefore, noise handling may be improved. Further, the speed of the motion estimation may be significantly improved. The system 100 according to example embodiments may increase frame rate or resolution of the frames for processing, for example, based on the data from the monocular event-based sensor. Further, the power consumption may be reduced based on the reduced processing of the frames. The power saved may then be consumed for post processing or quality enhancement. In addition, the inherent nature of EBS map generation, threshold-based event generation, will improve the computation of the motion vector for lossy nature of compression. In case of multi-frame noise reduction, the system 100 according to example embodiments may process more references for noise reduction. Therefore, motion estimation for processing of the video stream according to example embodiments may be comprehensive, simple, time-effective, accurate, and flexible in implementation, and may have a wide range of application.

It should be understood that example embodiments described herein should be considered in a descriptive sense only and not for purposes of limitation. Descriptions of features or aspects within each example embodiment should typically be considered as available for other similar features or aspects in other embodiments.

While example embodiments have been described with reference to the figures, it will be understood by those of ordinary skill in the art that various changes in form and details may be made therein without departing from the spirit and scope as defined by the following claims.

What is claimed is:

1. A method of motion estimation for processing a video stream comprising a plurality of frames, the method comprising:
   segmenting at least one frame, from among the plurality of frames, into a plurality of blocks;
   determining an event density factor for each block included in a frame, wherein the event density factor of the block corresponds to a number of events accumulated in the block across frames in a predetermined time duration;
   comparing the determined event density factor with a threshold value;
   estimating a motion vector of the block based on the comparison; and
   processing the block in the video stream based on the estimated motion vector of the block.

2. The method as claimed in claim 1, wherein the estimating of the motion vector of the block is performed based on the event density factor of the block being greater than the threshold value.

3. The method as claimed in claim 1, further comprising assigning a zero motion vector to the block to mark the block to be not processed based on the event density factor of the block being lower than the threshold value.

4. The method as claimed in claim 1, further comprising:
   generating an event density map based on the comparison of the determined event density factor with the threshold value for each block;
   generating a block-level segmentation map based on spatial correlation analysis of the event density map, wherein similar density areas are grouped together to generate the block-level segmentation map; and
   determining a size of each of the plurality of blocks to segment the frame for motion estimation based on the block-level segmentation map, the size being a minimum supported size for the motion estimation.

5. The method as claimed in claim 4, further comprising:
   setting the size as a first size based on the block-level segmentation map; and
   comparing the event density factor of the block having the first size with the threshold value.

6. The method as claimed in claim 5, further comprising:
   obtaining block-matching between the frames based on the event density factor of the block having the first size being greater than the threshold value; and
   determining whether there is a significant movement of the block.

7. The method as claimed in claim 5, further comprising:
   assigning a zero motion vector to the block to mark the block to be not processed based on the event density factor of the block being lower than the threshold value.

8. The method as claimed in claim 6, further comprising:
   obtaining a complexity of the motion estimation of the block having the first size based on determining there is the significant movement of the block; and
   determining whether the first size is the minimum supported size for the motion estimation.

9. The method as claimed in claim 6, further comprising:
   assigning a zero motion vector to the block to mark the block to be not processed based on determining there is no significant movement of the block.

10. The method as claimed in claim 8, further comprising:
    setting the size as a second size based on determining that the first size is not the minimum supported size for the motion estimation, the second size being a next smallest size that is different from the first size;
    repeating the setting of the size until the minimum supported size for the motion estimation is obtained.

11. A method of motion estimation for processing a video stream comprising a plurality of frames, the method comprising:
    segmenting at least one frame, from among the plurality of frames, into a plurality of blocks;
    determining an event density factor for each block included in a frame, wherein the event density factor of the block corresponds to a number of events accumulated in the block across frames in a predetermined time duration;
    comparing the determined event density factor with a threshold value of the event density factor;
    estimating motion vector of the block to process the video stream based on the comparison;
    generating an event density map based on the comparison of the event density factor with the threshold value for each block;
    generating a block-level segmentation map based on spatial correlation analysis of the event density map, wherein similar density areas are grouped together to generate the block-level segmentation map; and
    determining a size of each of the plurality of blocks to segment the frame for motion estimation based on the block-level segmentation map, wherein the size is a minimum supported size for the motion estimation.

12. The method as claimed in claim 11, further comprising:
    performing the motion estimation for the block, wherein the size is determined as a first size; and
    performing the motion estimation for the block, wherein the size is determined as a second size that is different from the first size; and
    segmenting the frame into the plurality of blocks of one of the first size and the second size based on complexity associated with the motion estimation for the block of the first size and the second size.

13. The method as claimed in claim 11, further comprising:
    estimating a first size of blocks to segment the frame for the motion estimation based on the block-level segmentation map;
    determining the event density factor for each block included in the frame;
    comparing the determined event density factor with the threshold value of the event density factor based on the event density map;

estimating a motion vector of the block based on the comparison; and processing the block in the video stream based on the estimated motion vector of the block.

14. The method as claimed in claim 13, wherein the estimating of the motion vector of the block is performed based on the event density factor of the block being greater than the threshold value.

15. A system of motion estimation for processing a video stream comprising a plurality of frames, the system comprising at least one processor configured to implement:
 a segmenting module configured to segment at least one frame, from among the plurality of frames, into a plurality of blocks;
 a determining module configured to communicate with the segmenting module and determine an event density factor for each block included in a frame, wherein the event density factor of the block corresponds to a number of events accumulated in the block across frames in a predetermined time duration;
 a comparing module configured to communicate with the determining module and compare the determined event density factor with a threshold value;
 an estimating module configured to communicate with the comparing module and estimate a motion vector of the block, based on the comparison; and
 a processing module configured to communicate with the estimating module and process the block in the video stream based on the estimated motion vector of the block.

16. The system as claimed in claim 15, wherein the estimating module is further configured to estimate the motion vector of the block based on the event density factor of the block being greater than the threshold value.

17. The system as claimed in claim 15, wherein the at least one processor is further configured to implement an assigning module configured to communicate with the comparing module and to assign a zero motion vector to the block to mark the block to be not processed based on the event density factor of the block being lower than the threshold value.

18. The system as claimed in claim 16, wherein the at least one processor is further configured to implement:
 a generating module configured to communicate with the comparing module and to:
  generate an event density map based on the comparison of the event density factor with the threshold value for each block; and
  generate a block-level segmentation map based on spatial correlation analysis of the event density map, wherein similar density areas are grouped together to generate the block-level segmentation map, and
 wherein the determining module is further configured to communicate with the generating module and to determine a size of each of the plurality of blocks to segment the frame for motion estimation based on the block-level segmentation map, wherein the size is a minimum supported size for the motion estimation.

19. The system as claimed in claim 18, wherein the processing module is further configured to communicate with the determining module and to:
 perform the motion estimation for the block, when the plurality of blocks has a first size; and
 perform the motion estimation for the block, when the plurality of blocks has a second size that is different from the first size, and
 wherein the segmenting module is further configured to communicate with the processing module and to segment the frame into the plurality of blocks of one of the first size and the second size based on complexity associated with the motion estimation for the block of the first size and the second size.

20. The system as claimed in claim 18, wherein the estimating module is further configured to estimate a first size of blocks for the segmentation of the frame for the motion estimation, based on the block-level segmentation map,
 wherein the determining module is further configured to determine the event density factor for each block included in the frame,
 wherein the comparing module is further configured to compare the determined event density factor with the threshold value based on the event density map, and
 wherein the estimating module is further configured to estimate the motion vector of the block based on the comparison, and
 wherein the processing module is further configured to process the block in the video stream based on the estimated motion vector of the block.

* * * * *